US012623587B2

(12) United States Patent
Gut

(10) Patent No.: US 12,623,587 B2
(45) Date of Patent: May 12, 2026

(54) METHOD FOR ADJUSTING VEHICLE LIGHTING WHEN DRIVING THROUGH A BUILDING SITE, AND VEHICLE

(71) Applicant: MERCEDES-BENZ GROUP AG, Stuttgart (DE)

(72) Inventor: Carsten Gut, Korb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 327 days.

(21) Appl. No.: 18/267,832

(22) PCT Filed: Oct. 13, 2021

(86) PCT No.: PCT/EP2021/078274
§ 371 (c)(1),
(2) Date: Jun. 16, 2023

(87) PCT Pub. No.: WO2022/128200
PCT Pub. Date: Jun. 23, 2022

(65) Prior Publication Data
US 2024/0051455 A1 Feb. 15, 2024

(30) Foreign Application Priority Data

Dec. 18, 2020 (DE) ..................... 10 2020 007 757.9

(51) Int. Cl.
*B60Q 1/14* (2006.01)
(52) U.S. Cl.
CPC .......... *B60Q 1/143* (2013.01); *B60Q 2300/14* (2013.01); *B60Q 2300/31* (2013.01);
(Continued)

(58) Field of Classification Search
CPC .............. B60Q 1/143; B60Q 2300/056; B60Q 2300/41; B60Q 2300/42; B60Q 2300/45; B60Q 1/085
See application file for complete search history.

(56) References Cited

U.S. PATENT DOCUMENTS 7,676,094 B2 3/2010 Hoki et al.
10,124,716 B1 * 11/2018 Gauthier ................ B60Q 1/143
(Continued)

FOREIGN PATENT DOCUMENTS

CN 1235913 A 11/1999
CN 110049898 A 7/2019
(Continued)

OTHER PUBLICATIONS

Office Action dated Jul. 2, 2024 in related/corresponding JP Application No. 2023-537170.
(Continued)

*Primary Examiner* — Wei (Victor) Y Chan
(74) *Attorney, Agent, or Firm* — PATENT PORTFOLIO BUILDERS PLLC

(57) ABSTRACT

A method for adjusting vehicle lighting when driving through a building site involves adjusting a light pattern cast by at least one vehicle headlight into an environment from a top light field, referred to as high beam, and a bottom light field, referred to as low beam, upon recognizing that a building site is being driven through by changing a light intensity with which the light pattern is generated. The light intensity at which the low beam is emitted is increased to a determined value when driving through the building site.

14 Claims, 1 Drawing Sheet

(52) U.S. Cl.
CPC ...... *B60Q 2300/32* (2013.01); *B60Q 2300/33*
(2013.01); *B60Q 2300/45* (2013.01)

(56) References Cited

U.S. PATENT DOCUMENTS

| | | | | |
|---|---|---|---|---|
| 11,590,881 | B2 * | 2/2023 | Funk .................... | F21S 41/645 |
| 2011/0050102 | A1 | 3/2011 | Le Bars et al. | |
| 2011/0280026 | A1 | 11/2011 | Higgins-Luthman | |
| 2013/0058116 | A1 * | 3/2013 | Galbas .................... | B60Q 1/48 |
| | | | | 362/512 |
| 2016/0332560 | A1 * | 11/2016 | Nakatani ............... | F21S 41/153 |
| 2019/0248276 | A1 * | 8/2019 | Sutou .................... | B60Q 1/507 |
| 2020/0001776 | A1 * | 1/2020 | Potter ................. | B60Q 1/1423 |
| 2023/0098917 | A1 * | 3/2023 | Mochizuki .............. | F21S 41/43 |
| | | | | 362/509 |

FOREIGN PATENT DOCUMENTS

| | | | |
|---|---|---|---|
| DE | 19922735 | A1 | 12/1999 |
| DE | 102006048503 | A1 | 4/2008 |
| DE | 102011014455 | A1 | 9/2012 |
| DE | 102017223446 | A1 | 6/2019 |
| JP | 2005201741 | A | 7/2005 |
| JP | 2008149909 | A | 7/2008 |
| JP | 2008207738 | A | 9/2008 |
| JP | 2011046374 | A | 3/2011 |
| JP | 2013109911 | A | 6/2013 |
| KR | 0166299 | B1 | 12/1998 |

OTHER PUBLICATIONS

Office Action dated Mar. 13, 2025 in related/corresponding KR Application No. 10-2023-7018602.
Drivingspirituk; "Audi Matrix Laser Headlights—Future Technology;" Feb. 18, 2015; https://www.youtube.com/watch?v=HtitwsV4fAE.
International Search Report and Written Opinion mailed Jan. 21, 2022 in related/corresponding International Application No. PCT/EP2021/078274.
Office Action dated Jul. 30, 2025 in related/corresponding CN Application No. 202180082075.7.

* cited by examiner

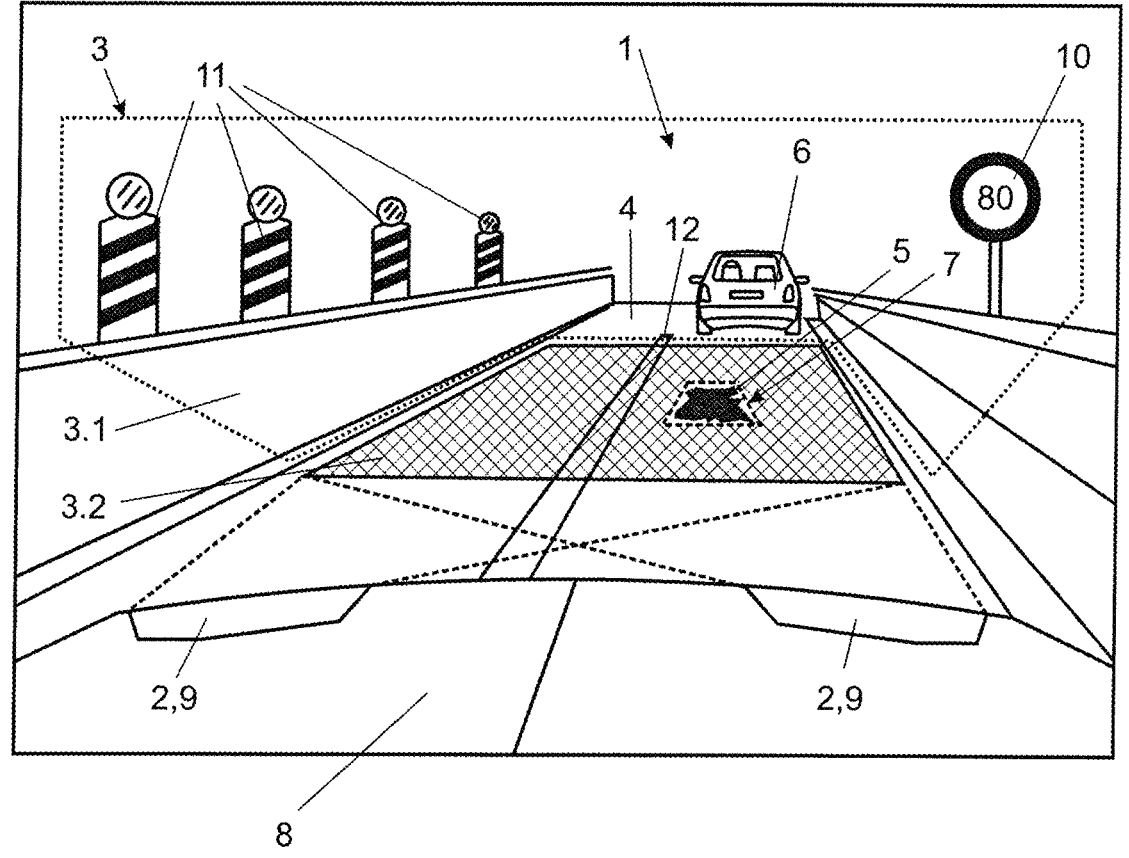

METHOD FOR ADJUSTING VEHICLE LIGHTING WHEN DRIVING THROUGH A BUILDING SITE, AND VEHICLE

BACKGROUND AND SUMMARY OF THE INVENTION

Exemplary embodiments of the invention relate to a method for adjusting vehicle lighting when diving through a building site, as well as to a vehicle.

To ensure that vehicles can also be operated safely in darkness, for example at night, vehicles typically have a lighting device. An environment around the vehicle, in particular a road portion lying ahead of the vehicle in the direction of travel, can be lit with such a lighting device. Depending on the situation, a brightness of the light emitted by the lighting device can be adjusted, as can a direction of propagation in which the light is cast and a cross-sectional surface that the light occupies. Vehicle headlights are thus typically operated with low beam in urban environments and with high beam outside of urban environments when there is no danger of blinding further traffic participants. A person driving a vehicle is thus enabled to see further in darkness. By also increasing the brightness of the light emitted by the lighting device in addition to its range, objects that are difficult to recognize can be perceived more easily.

For this purpose, a person driving a vehicle can manually switch back and forth between low beam and high beam. So-called adaptive high beam assistants are also known, which automatically adjust a lighting range and/or brightness regulation of the light emitted by the lighting device depending on sensor signals. Modern vehicles use LEDs as a lighting means, in particular in the form of so-called matrix headlights. Individual LEDs of the matrix headlight, also referred to as pixels, can be controlled in a targeted manner to exclude regions of a light cone emitted from the matrix headlights. Thus, for example, exactly the regions of the light cone can be excluded in which further traffic participants are located. Thus, high beam can be emitted and blinding further traffic participants can be simultaneously avoided. It is further known to shift a propagation direction of light emitted by the lighting device, for example by moving a reflector and/or a lens of the lighting device. Thus, for example, adaptive cornering lighting can be achieved.

Driving through a building site at night represents a demanding traffic situation. A road width in the region of a building site is often reduced, which requires a person driving a vehicle to be highly alert to safely operate their vehicle. This is made more difficult by poor visibility conditions at night. People driving vehicles are blinded by a comparatively high number of reflecting environment objects such as traffic signs and/or warning beacons that reflect the light emitted by the lighting device back in the direction of the vehicle or the person driving the vehicle due to a retroreflective layer. Furthermore, a reflectivity of a renewed road surface in relation to an old road surface can be diminished, whereby more light is absorbed by the road, whereby a traffic situation in the building site region appears darker in turn. Environment objects, road markings, and exits can thus be hard to recognize or easily overlooked.

A method for operating a vehicle having a lighting device is known from DE 10 2011 014 455 A1. According to the method disclosed in the document, driving through a building site is recognized and a light distribution of light emitted by vehicle headlights is automatically adjusted when driving through the building site. A static turning light is thus turned on when a building site is recognized or a cornering light is activated, and a propagation direction of the cornering light or of the static turning light is directed laterally away from the vehicle to better illuminate an edge region of the road in the building site area. An emitted light intensity is also increased according to an embodiment of the invention disclosed in the document. A person driving a vehicle can hereby better perceive road edges and/or objects located in a corresponding region, whereby a safer driving operation is enabled. To recognize that a building site is being driven through, camera images generated by a camera are evaluated and/or a current vehicle position is compared with map material, wherein building site regions are recorded in the map material. Additionally, or alternatively, driving through a building site can also be determined by a particular vehicle speed, as a reduced speed limit usually applies in building sites. A radio signal can further be transmitted to the vehicle, for example via a vehicle-to-X communication interface, to inform the vehicle about the building site. Here it is disadvantageous, however, that by brightening a lateral road edge, more light is also cast onto reflecting objects such as traffic signs and warning beacons, whereby the person driving the vehicle is blinded to an even greater extent.

A vehicle lighting system is also known from DE 199 22 735 A1. The document describes adjusting light emitted by the vehicle lighting system depending on current weather conditions and/or the condition of a road surface. On the one hand, a lighting direction and a surface of the light emitted by the vehicle lighting system can be adjusted, and a brightness and/or color of the light emitted can be varied. An environment is, in particular, brightened if adverse weather conditions such as rain, fog, or snow are present. A lighting adjustment also takes account of puddles detected on the road surface. Individual headlights of the vehicle and/or components of the headlights, such as reflectors, can be pivoted and/or assistance headlights, e.g., fog lights can be added. Adjusting a propagation direction and/or surface occupied by light emitted by the vehicle lighting system occurs depending on, among other things, the steering angle of the vehicle and navigation data, from which a road course is determined, and by evaluating camera images, whereby in addition to a classification of weather conditions, further traffic participants can also be recognized. The light emitted by the vehicle lighting system is thus adjusted depending on the further traffic participants in order not to blind said participants.

Exemplary embodiments of the present invention are directed to an improved method for adjusting vehicle lighting when driving through a building site, in which a person driving through a building site is not blinded to such a great extent while still being able to more easily perceive a road marking that would otherwise be difficult to recognize.

In a method for adjusting vehicle lighting when driving through a building site of the kind specified in the introduction, the light intensity with which the low beam is being emitted is increased to a determined value when driving through the building site.

In darkness, especially at night, visual perception in the region of a building site is limited. Causes hereof are, for example, a new asphalt layer that reflects light poorly and a comparatively high number of reflecting environment objects such as traffic signs and/or warning beacons. As a result, it is sometimes more difficult for a person driving a vehicle to recognize relevant road markings, which makes it more difficult for the person driving the vehicle to remain within their lane. The person driving the vehicle can further sometimes have greater difficulty recognizing environment objects and/or drive past an exit, as the person driving the vehicle notices the exit too late. Safety in road traffic can thus be reduced. With the assistance of the method according to the invention, however, a sufficient level of visual perception can be achieved even when driving through a building site at night. Only a comparatively small region in an immediate environment in front of the vehicle in a direction of travel is lit particularly brightly. Objects that are difficult to recognize and road markings can be perceived more clearly due to the increased light intensity. As only the light intensity of the bottom light field, i.e., the low beam, is increased, a hazard potential for the person driving the vehicle posed by the reflection of light emitted by the vehicle headlights by the reflecting environment objects is reduced.

Increasing the light intensity of the low beam is possible in different ways. For example, additional lighting means and/or lights are switched on, for example fog lights and/or previously deactivated LEDs or pixels of a matrix headlight. It is also conceivable to increase a power with which the lighting means are provided. A blocking member can also be arranged in a beam path between the lighting means and the road, which is moved at least partially out of the beam path to increase the light intensity. It is possible to increase the light intensity in stages or continuously.

Driving through a building site should be taken to mean any time before, during and also after driving through the building site. The light intensity can thus be increased in advance at a set distance before reaching a traffic sign indicating the building site, or the light intensity can be increased only after the vehicle has travelled a certain distance in the building site. The light intensity can also be increased depending on a determined distance until the end of a building site and reset back into its original state when leaving the building site region or after a determined duration or distance after leaving the building site region. While the light intensity of the low beam is increased, a high beam can also meanwhile be emitted by the vehicle headlights.

An advantageous development of the method provides that the light intensity at which the high beam is emitted is reduced or the high beam is deactivated when driving through the building site. As already mentioned, the person driving the vehicle is blinded by light reflected from environment objects. By reducing a brightness of the high beam, or particularly advantageously by the high beam being completely deactivated when driving through the building site, a danger that the person driving the vehicle is blinded by reflecting light emitted by the vehicle can also be reduced. An even safer operation of the vehicle when driving through a building site at night is thus possible.

Corresponding to a further advantageous embodiment of the method, driving through the building site is recognized by at least one of the following methods:

evaluating at least one camera image generated by a vehicle camera;

evaluating a sensor signal provided by a radar system;

comparing a current vehicle position, in particular a vehicle position determined by means of a global navigation satellite system, with map material;

evaluating a current vehicle speed; and/or evaluating a wireless building site indication signal, in particular a building site indication signal transmitted via a vehicle-to-X communication interface.

With the assistance of the specified methods, it is possible to detect building sites particularly reliably. Any camera, for example a multi-purpose camera, can be used as a vehicle camera. This could be a mono or stereo camera. In particular, in addition to visible light, the vehicle camera can also record infra-red light, which guarantees even more reliable image recognition in darkness. Spacing information can be reliably recorded even in darkness with the assistance of the radar system. In particular at low speeds and low spacings, an ultrasound sensor system can also be used to determine spacing as an alternative or in addition to a radar system. A spacing determination using a laser scanner such as a lidar is also conceivable. As in the prior art, a building site region can also be compared using comparison of a current vehicle position with a building site position entered in map material. Driving through a building site region can also be recognized by an atypical vehicle speed in relation to a road currently being driven along, for example a speed of 80 on a motorway. The wirelessly transmitted building site indication signal can further indicate the building site, wherein additional information, for example a length of the building site, can also be transmitted with the building site indication signal.

A further advantageous embodiment of the method further provides that the determined value is changed depending on a road condition, in particular a road surface and/or on puddles detected on the road. By changing the light intensity of the low beam depending on the road condition, an even safer lighting of the building site region can be guaranteed. The light intensity of the low beam can thus be increased depending on how strongly the road surface reflects light. If, for example, the road surface has not been renewed in a particular building site, then this road surface also does not absorb the light emitted by the vehicle headlights to such a great extent. In this case, the light intensity of the low beam should also be increased less significantly. This also applies in situations in which puddles are present on the road. If it has rained, for example, or if there is snow on the road, a reflective capability of the road increases. In this case too, it is sufficient to increase the light intensity of the low beam less significantly. The danger is thus also reduced of light from the road being reflected in the direction of environment objects such as road signs and/or warning beacons, whereby a danger of blinding the person driving the vehicle can be reduced even further.

Corresponding to a further advantageous embodiment of the method, sensor data of at least one vehicle camera and one laser scanner is combined. Using the sensor combination, the road condition can be particularly reliably detected. If one sensor system stops working or delivers faulty sensor signals, erroneous detections can be avoided by taking into account the sensor data provided by the functioning sensor. It is also possible that further sensor systems are taken into account in the sensor combination. Sensor signals additionally emitted by an ultrasound or radar system can thus also be combined with the sensor data of the vehicle camera and the laser scanner in addition to detect the road condition.

A further advantageous embodiment of the method further provides that when an exit is recognized, a light pattern focus is shifted to a region of the environment corresponding to the exit or the surface occupied by the light pattern is broadened so that the region of the environment corresponding to the exit is also at least partially lit. Due to the construction limitations in a building site region, exits are often shifted or have a shortened and/or narrower lane width. The exits in the region off a building site are thus sometimes particularly difficult to recognize. At night in particular, a considerable risk then arises that a person driving a vehicle drives past an exit. By lighting up the exits more intensely when diving through the building site, it is made possible for the person driving the vehicle to better perceive the exits. It is thus possible to reduce a risk that the person driving the vehicle unintentionally drives past an exit. On the one hand, a light beam emitted by a vehicle headlight can be pivoted to light the building site and/or additional headlights or lighting means can be added to light an environment region corresponding to the exit. An exit is, in particular, only lit more brightly if the person driving the vehicle intends to take a corresponding exit. This can be determined by the indicator being set, for example. An intention of the person driving the vehicle to take an exit can also further be deduced via an analysis of a planned route, for example of a route input into a navigation system of the vehicle. Unnecessary lighting of irrelevant exits is thus avoided. A particularly comfortable operation of the vehicle or of the vehicle lighting can thus be guaranteed when driving through a building site.

Corresponding to a further advantageous embodiment of the method, when at least one further traffic participant located in the vehicle environment is detected, lighting of at least one determined region of the light pattern, in particular the bottom light field, is excluded in a targeted manner. An undesirable blinding of further traffic participants can thus be avoided. Further traffic participants in the vehicle environment can, for example, be recognized by evaluating camera images. The further traffic participants can also be recognized via transmission or receipt of a signal transmitted via a vehicle-to-vehicle communication interface. Alternatively, or additionally, a relative position or a relative distance between the vehicle and the further traffic participants can also be determined, for example using a spacing recording system such as a laser scanner and/or a spacing radar. The regions of the light pattern or the lower light field that are to be excluded when transmission of the light emitted by the vehicle headlights should be blocked can thus be calculated. This is generally already known from adaptive high beam assistants. If, however, puddles are present on the road, then the puddles reflect the bright low beam, whereby the further traffic participants from the direction of the road can be blinded. As specifically the light intensity of the low beam of the vehicle is increased, the further traffic participants are then blinded to a particularly great extent. By evaluating spatial relationships of the further traffic participants with respect to the vehicle, and taking into consideration angles of reflection between vehicle headlights, the road, and the further traffic participants, however, individual regions of the bright low beam cast onto the road can be excluded so that the further traffic participants are not blinded by light reflected from a wet road. Safety in road traffic can thus be further increased.

At least one LED headlight, in particular a matrix headlight, is preferably used to emit the light pattern. Any vehicle headlight can generally be used to emit the light pattern. This vehicle headlight can for example use incandescent light bulbs, halogen bulbs or xenon bulbs as a lighting means. A laser could also be used as a lighting means. LEDs have a particularly high efficiency, however, whereby a bright low beam can be generated with a simultaneously low energy requirement. Using a matrix headlight, a direction in which the light pattern is cast in the environment can be particularly easily adjusted. Thus, no moveable parts are necessary for this purpose, which simplifies a construction of the vehicle headlight and also makes the vehicle headlight robust against vibrations. A reliability with which the light pattern is cast in the environment corresponding to a provided direction can thus be increased.

In the case of a vehicle having at least one headlight, an environment monitoring system, and a computing unit, the computing unit is equipped according to the invention to carry out a method previously described. The vehicle can be any vehicle, such as a passenger car, heavy goods vehicle, transporter, bus or the like. To emit the light pattern, one or more vehicle headlights can be used. Different sensor systems are used as environment monitoring systems. For example, the vehicle environment can be monitored using a camera, a radar system, a laser scanner, or the like. The computing unit can be any computing unit, such as a control on-board computer, a control device of a vehicle sub-system or a controller separately provided for carrying out the method. Camera images can also be evaluated using artificial intelligence, for example in the form of an artificial neural network such as a convolutional neural network.

Further advantageous embodiments of the method according to the invention result from the exemplary embodiment, which is described in more detail in the following with reference to the FIGURE.

BRIEF DESCRIPTION OF THE SOLE FIGURE

The sole FIGURE shows a vehicle driving through a building site at night from the perspective of a person driving a vehicle.

DETAILED DESCRIPTION

The FIGURE shows a vehicle 8 driving through a building site 1 at night. The vehicle 8 comprises several vehicle headlights 2, also referred to as headlights 9 in the following, for brightening a vehicle environment. The headlights 9 emit light to generate a light pattern 3. The light pattern 3 consists of a top light field 3.1 and a bottom light field 3.2, the top light field 3.1 corresponding to high beam and the bottom light field 3.2 to low beam. In the FIGURE, the headlights 9 only project light to form the bottom light field 3.2.

When driving through a building site 1, a visual perception of the building site 1 is often limited as a road surface of a renewed road 4 reflects light badly and a plurality of reflecting environment objects such as road signs 10 and warning beacons 11 are provided in the region of the building site 1, the objects reflecting light emitted by the headlights 9 back in the direction of the person driving the vehicle, whereby the person driving the vehicle is blinded. A visual perception of the building site region 1 is improved according to the invention by the headlights 9 emitting low beam light with an increased light intensity in comparison with typical low beams. A road surface absorbing light can also be brightened using the brighter low beam, and the person driving the vehicle being blinded can additionally be avoided as reflecting environment objects such as the road signs 10 and the warning beacons 11 are not lit. It is thus possible for the person driving the vehicle to better perceive road markings 12, whereby the person driving the vehicle can also remain in a lane they are driving in more easily. A driving comfort of driving through the building site is thus also improved.

It can here occur that reflecting regions are present on the road 4, for example in the form of puddles 5. Light emitted by the headlights 9 is reflected from the puddles 5 in the direction of further traffic participants 6, whereby the traffic participants are blinded. As the low beam emitted using the method according to the invention is particularly bright, the further traffic participants 6 are also blinded to a significant extent. To avoid this, individual regions 7 of the light pattern 3, preferably the lower light field 3.2, can be excluded. Further traffic participants 6 being blinded can thus be reliably avoided. Camera images of the scene shown in the FIGURE are generated and evaluated to calculate the regions 7 to be excluded, for example. The further traffic participants 6 and the puddles 5 can thus be recognized, and spatial relationships between the traffic participants 6, the puddles 5 and the vehicle 8 or the headlights 9 can be calculated, which enables the regions 7 to be adaptively excluded. Additionally, further sensor data can here be taken into account, for example spacing information generated with a radar or laser scanner system.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for adjusting vehicle lighting of a vehicle when driving through a building site, the method comprising:

determining that the vehicle is driving through the building site, wherein the vehicle lighting projects a light pattern in a top light field, which is a high beam, or in a bottom light field, which is a low beam, wherein the low beam is projected at a first intensity;

adjusting, responsive to the determination that the vehicle is driving through the building site, the projected light pattern to the low beam at a second intensity that is increased compared to the first intensity; and shifting, when an exit is recognized while the vehicle is driving through the building site, a light pattern focus to a region of an environment of the vehicle corresponding to the exit or a surface occupied by the light pattern is broadened so that the region of the environment corresponding to the exit is also at least partially lit.

2. The method of claim 1, wherein the light intensity at which the high beam is emitted is reduced or the high beam is deactivated when driving through the building site.

3. The method of claim 1, wherein the determination that the vehicle is driving through the building site comprises:

evaluating at least one camera image generated by a vehicle camera of the vehicle;

evaluating a sensor signal provided by a radar system of the vehicle;

comparing a current vehicle position, which is determined by a global navigation satellite system, with map material;

evaluating a current vehicle speed; or evaluating a wireless building site indication signal transmitted via a vehicle-to-X communication interface.

4. The method of claim 1, wherein a value of the second intensity is changed depending on a road condition, which is a road surface or puddles detected on the road.

5. The method of claim 4, wherein the road condition is recognized by combining sensor data of at least one vehicle camera and sensor data of a laser scanner.

6. The method of claim 1, wherein when at least one further traffic participant located in a vehicle environment is detected, lighting of at least one determined region of the projected light pattern, is omitted in a targeted manner, wherein the at least one determined region is the bottom light field.

7. The method of claim 1, wherein the projected light pattern is produced by at least one LED matrix headlight.

8. A vehicle, comprising:

at least one headlight;

an environment monitoring system; and a computing unit coupled to the at least one headlight and the environment monitoring system, wherein the computing unit is configured to determine that the vehicle is driving through a building site, wherein the vehicle lighting projects a light pattern in a top light field, which is a high beam, or in a bottom light field, which is a low beam, wherein the low beam is projected at a first intensity;

adjust, responsive to the determination that the vehicle is driving through the building site, the projected light pattern to the low beam at a second intensity that is increased compared to the first intensity; and shift, when an exit is recognized while the vehicle is driving through the building site, a light pattern focus to a region of an environment of the vehicle corresponding to the exit or a surface occupied by the light pattern is broadened so that the region of the environment corresponding to the exit is also at least partially lit.

9. The vehicle of claim 8, wherein the light intensity at which the high beam is emitted is reduced or the high beam is deactivated when driving through the building site.

10. The vehicle of claim 8, wherein the computing unit is configured to determine that the vehicle is driving through the building site by:

evaluating at least one camera image generated by a vehicle camera of the vehicle;

evaluating a sensor signal provided by a radar system of the vehicle;

comparing a current vehicle position, which is determined by a global navigation satellite system, with map material;

evaluating a current vehicle speed; or evaluating a wireless building site indication signal transmitted via a vehicle-to-X communication interface.

11. The vehicle of claim 8, wherein a value of the second intensity is based on a detected road condition.

12. The vehicle of claim 11, wherein the vehicle further comprises:

a camera sensor; and a laser scanner, wherein the computing unit is configured to detect the road condition by combining sensor data of the camera and sensor data of the laser scanner.

13. The vehicle of claim 8, wherein when at least one further traffic participant located in a vehicle environment is detected, lighting of at least one determined region of the projected light pattern, is omitted in a targeted manner, wherein the at least one determined region is the bottom light field.

14. The vehicle of claim 8, wherein the at least one headlight is a LED matrix headlight.

\* \* \* \* \*